United States Patent [19]

Yesnik

[11] Patent Number: 5,029,686
[45] Date of Patent: Jul. 9, 1991

[54] CLUTCH SEPARATOR PLATES

[75] Inventor: Marc A. Yesnik, Chicago, Ill.

[73] Assignee: Borg-Warner Automotive, Inc., Sterling Heights, Mich.

[21] Appl. No.: 556,927

[22] Filed: Jul. 20, 1990

[51] Int. Cl.$^5$ ............................................. F16D 13/60
[52] U.S. Cl. ........................... 192/70.14; 192/107 M; 204/192.16
[58] Field of Search .................. 192/70.14, 107 M; 204/192.16

[56] References Cited

U.S. PATENT DOCUMENTS

| | | | |
|---|---|---|---|
| 3,071,489 | 1/1963 | Pelton et al. | 117/22 |
| 3,245,508 | 4/1966 | Livezey | 192/107 |
| 3,744,604 | 7/1973 | Austen | 192/53 C |
| 3,848,313 | 11/1974 | Guvonnet | 29/191.2 |
| 3,897,582 | 7/1975 | Olcott | 428/114 |
| 4,419,202 | 12/1983 | Gibson | 204/192 N |
| 4,422,538 | 12/1983 | Krumm | 192/70.14 |
| 4,428,812 | 1/1984 | Sproul | 204/192 R |
| 4,904,316 | 2/1990 | Dawes et al. | 148/318 |

FOREIGN PATENT DOCUMENTS

| | | | |
|---|---|---|---|
| 3326409 | 3/1984 | Fed. Rep. of Germany | 192/70.14 |
| 228876 | 10/1985 | Fed. Rep. of Germany | 188/25 |
| 0041023 | 2/1986 | Japan | 192/70.14 |

OTHER PUBLICATIONS

Brainard, W. A. and Wheeler, D. R., "Use of a Nitrogen-Argon Plasma to Improve Adherence of Sputtered Titanium Carbide Coatings on Steel", Journal of Vac. Science Technology, vol. 16, No. 1 (Jan./Feb. 1979), pp. 31-36.

Christy, R. L. and Ludwig, H. R., "R. F. Sputtered MoS$_2$ Parameter Effects on Wear Life", Thin Solid Films, vol. 64 (1979) pp. 223-229.

Primary Examiner—Allan D. Herrmann
Assistant Examiner—Andrea Pitts
Attorney, Agent, or Firm—James A. Geppert; Greg Dziegielewski

[57] ABSTRACT

A clutch separator plate (24) utilized in a clutch or brake pack (10) for an automotive transmission for vehicles, with the plates being internally or externally splined to be operatively connected to the rotatable and/or stationary members (12, 14) in a torsional coupling, wherein the separator plate surfaces (44) are treated by a suitable surface treatment, such as lapping, and the sputter coated with titanium nitride or a similar material (46) to provide a surface texture which enhances the frictional characteristics of the plate but does not substantially increase the wear of the lining of interleaved clutch plates (16).

10 Claims, 5 Drawing Sheets

CLUTCH SEPARATOR PLATES

TECHNICAL FIELD

The invention disclosed herein relates to improvements in clutch separator plates, such as those used in clutch or brake disc packs for vehicle automatic transmissions or the like, wherein modifications in the processing and finishing of the clutch plate surfaces improve the frictional characteristics for the plates.

BACKGROUND

Conventional multiple disc clutches and/or brakes employed in a drive train establishing device for a vehicle transmission generally include one or more clutch disc packs consisting of a plurality of engagable clutch plates having teeth on the periphery thereof and alternating with clutch separator plates having similar teeth on the periphery opposite to the teeth of the clutch plates. Thus, one set of plates are splined to an encompassing clutch drum or stationary member while the alternating set of plates are splined onto a central shaft or ring.

Prior efforts to improve the frictional characteristics of the clutch or brake resided in improvements in the characteristics of the friction lining for the clutch plates or discs, and substantially no attention had been paid to the frictional characteristics of the separator plates. As the friction linings for more recent clutch discs have been formed utilizing a resin-impregnated, paper-based friction material, the separator plates should not be formed of a material or have a surface texture which will cause undue wear of the lining.

For separator plates interleaved between the clutch plates that have suitable friction linings on the opposite surfaces thereof, the steel separator plates are conventionally finished by a tumbling process. To enhance the frictional characteristics of the separator plates when used in conjunction with the friction-lined clutch plates, it was suggested to alter the surface characteristics of the steel plates. Various surface preparations and procedures were tried, such as sandblasting, shot peening and knurling; however, the resulting surfaces either did not increase the coefficient of friction or caused undue wear and/or damage to the friction lining of the mating clutch disc faces.

Also, coating of the tumbled separator plates with a wear-resistant material was tried, but increased wear of the friction lining resulted. As an example, the steel plates were sputter-coated with a layer of titanium nitride, a material known for its wear resistant capabilities for tool bits, saw blades, etc. Although a slight increase may have been detected in the coefficient of friction, this was clearly offset by a substantial increase in the wear of the friction lining. The present invention solves the problem of increased wear of the friction linings while significantly enhancing the coefficient of friction for the clutch separator plates.

DISCLOSURE OF THE INVENTION

The present invention relates to the novel treatment of a steel clutch separator plate as used in a clutch pack interleaved between clutch discs having friction linings on the opposite surfaces thereof. The surface treatment of the steel plate produced a surface roughness in the range of 3 to 9 microinches Ra (arithmetic average). To enhance the hardness and wearability of the surface, a thin coating of titanium nitride was applied to the treated surface so as not to disturb or affect the characteristics of the surface finish. With the coated surface having the desired texture, the wear of the mating friction linings is the same or slightly reduced compared with the tumbled steel plates, but the coefficient of friction is significantly increased.

The present invention also relates to a novel treated steel separator plate for a clutch pack where the surface of the separator plates is subjected to a surface treatment such as lapping to provide a surface roughness of from 3 to 9 microinches (Ra). Then a titanium nitride coating equal to or less than 1.5 microns is sputter-coated or deposited by other similar processes so as not to disturb the characteristics of the surface treated finish. Further, the novel treatment may be provided by chemical means rather than by mechanical means to obtain the surface characteristics for a clutch separator plate wherein the plate has a surface roughness of from 3 to 9 microinches (Ra) prior to coating.

MODE FOR CARRYING OUT THE INVENTION

Figure 1:
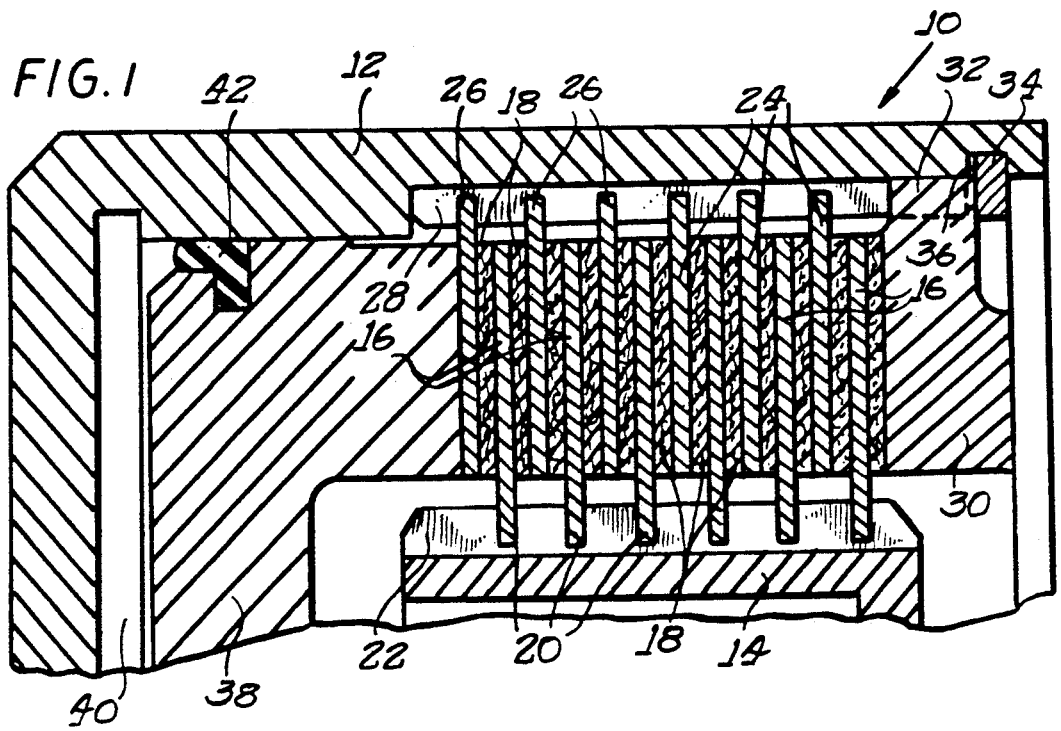
FIG. 1 is a partial cross sectional view through a clutch pack showing the friction and separator plates.

Referring more particularly to the disclosure in the drawings wherein is shown an illustrative embodiment of the present invention, FIG. 1 discloses a portion of the upper half of a conventional clutch pack 10 utilized in a clutch or brake for the automatic transmission of an automotive vehicle comprising a metal drum 12 formed of cast iron, steel or powdered metal and mounted for rotation on suitable bearings (not shown), and an internal metal hub or shaft 14 also formed of one of the above materials and suitably mounted for rotation. The drum 12 is adapted to be driven by a torque apply member and the hub or shaft 14 is adapted to be drivingly connected to a load to be driven, although the driving and driven portions could be reversed.

Between the drum and hub are located a plurality of annular metal plates comprising alternating friction discs 16 and separator plates 24; the friction discs 16 having friction linings 18 on the opposite surfaces thereof and internal teeth 20 in mesh with external splines or ribs 22 on the exterior surface of the hub 14, and the separator plates 24 having external teeth 26 meshing with the internal splines or ribs 28 on the interior surface of the drum 12. Although shown as operatively connected to a rotating member 12, the separator plates 24 could be connected to a suitable stationary member as where the coupling is applied to a brake rather than a clutch in the transmission. An annular backing plate 30 has teeth 32 on its periphery meshing with the drum splines 28 and is retained axially through a retaining ring 34 mounted in an internal annular groove 36 in the drum.

An annular apply piston 38 is mounted to slide axially within the drum and is normally urged leftward (as seen in FIG. 1) to a disengaged position by clutch release springs or other suitable release means (not shown). Fluid under pressure is admitted into the chamber 40 at the left hand end of the piston 38 to urge the piston towards the clutch plates 16 to squeeze the clutch plates 16 having the opposed friction facings 18 and the separator plates 24 together between the piston and the backing plate 30. With the plates 16, 24 engaged, a power path is established for torque transmittal between drum 12 and the hub 14. An annular seal 42 in an external groove in the periphery of the piston prevents leakage from the apply chamber 40 past the piston 38. When the fluid in the chamber is allowed to exhaust or exit, the return means moves the piston to the left to its disengaged position to disengage the clutch.

Figure 2:
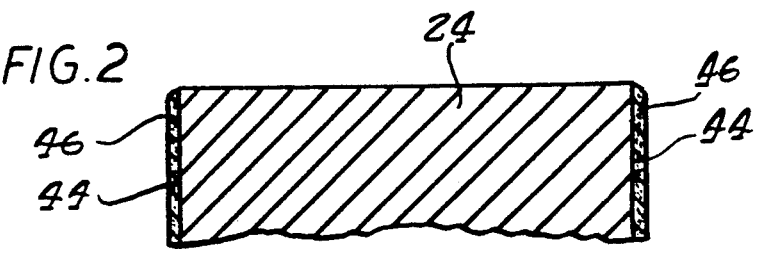
FIG. 2 is an enlarged partial cross sectional view of a coated separator plate.
Figure 3:
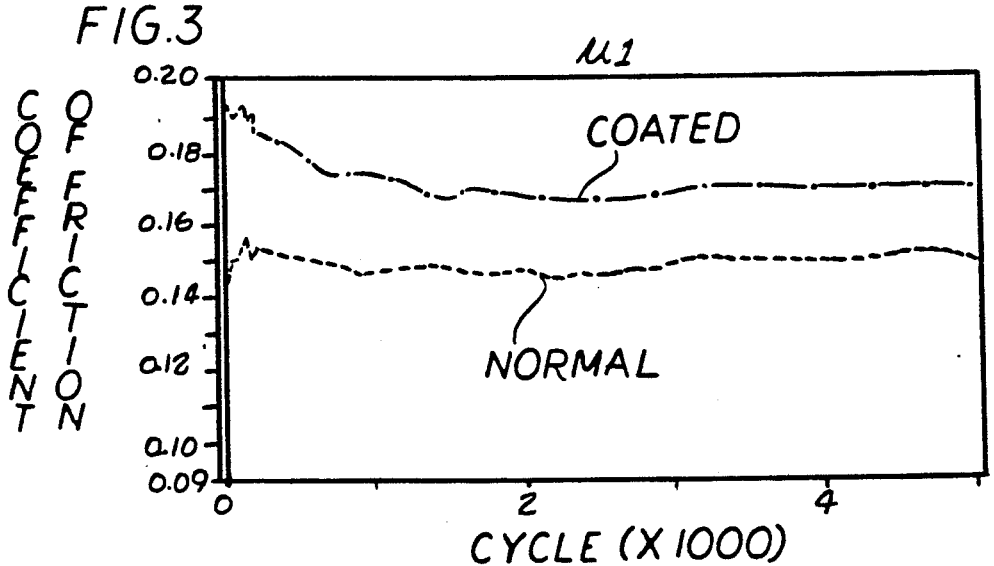
FIG. 3 is a graph comparing normal separator plates with titanium nitride-coated plates for initial dynamic friction (relative fast speed).
Figure 4:
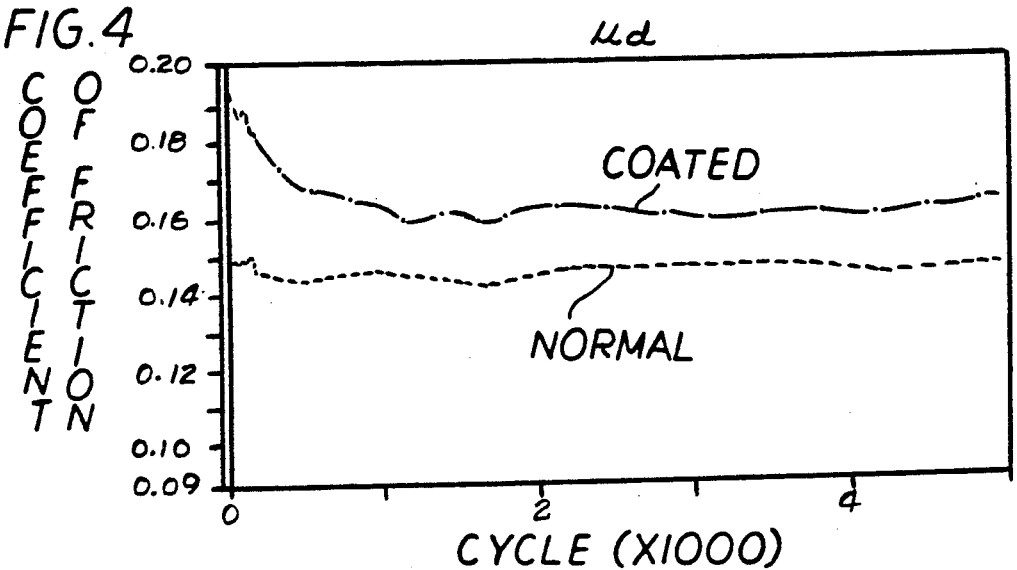
FIG. 4 is a graph similar to FIG. 3, but comparing the median dynamic frictions (intermittent speed).
Figure 5:
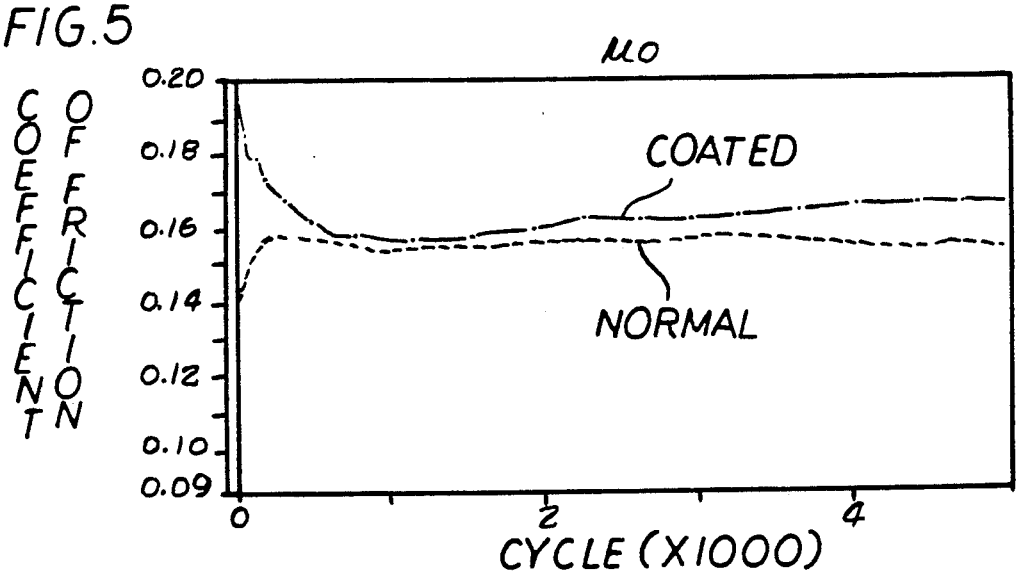
FIG. 5 is a graph similar to FIG. 3, but comparing the final dynamic frictions (slower speed).

FIG. 2 discloses a portion of a single separator plate 24 utilized in the clutch pack separating a pair of adjacent clutch plates 16 having suitable linings 18 thereon. The opposed surfaces 44 of the separator plate formed of a suitable metal, such as steel, have been treated in a novel manner to enhance their frictional characteristics in cooperation with the clutch plates that come into engagement with them. It is this novel treatment that is the subject of the present invention. This treatment is a two-stage process that generally includes a surface finish operation followed by the suitable deposition of a material 46, such as titanium nitride, onto the lapped surface.

Laboratory tests have shown that the metal mating surface and coating is a very important property in determining the friction and wear of clutch linings. With the objective of increasing friction for higher torque (or lighter weight) and no increase in wear of the clutch lining, it was found that standard resin-saturated, paper-based linings running against diamond lapped (3 to 9 microinches Ra) 1035 steel gave very high friction and essentially no increase in wear of the clutch lining. However, with conventionally tumbled 1035 steel having a titanium nitride sputter coating alone, the wear of the clutch lining increased; and with lapping alone, there was substantially no lining wear, but the steel separator plate would gradually wear as the test progressed. The lapping alone will provide an increase in the friction of the clutch. In combining the lapping with the sputter coating, it is believed that the coating of titanium nitride stabilizes the surface treatment of lapping the steel plate (locks in the texture) and provides chemical resistance to the automatic transmission fluid. This surface finish with titanium nitride was found to provide the optimum texture which allowed fluid suspension/support in the contact area. It appeared that the titanium nitride coating preserved the surface texture from the lapping operation in its initial state. A similar increase in friction was observed for a surface treatment of lapping with 14.5 micron aluminum oxide, although the clutch lining wear was slightly higher than for the diamond lapping.

Other surface finishes, such as knurling, sandblasting, or shot peening, either did not increase the coefficient of friction or, if friction increased, the wear of the friction material also increased, such as shown in Table I. Surface roughness and profile were measured before and after testing using a Gould Profilometer. In most instances, both wear and surface roughness increased. Friction and wear tests were run in the laboratory with a modified Shell 4-Ball Tester under conditions of continuous slip at 1910 rpm and at a temperature of 200 degrees F. in a Texaco TL8570 automatic transmission fluid (ATF) for a thirty minute break-in period. This was followed by continuous slip conditions at ten speed intervals from 1910 to 280 rpm over a period of approximately one hour (total test time of approximately one and one-half hours). For these tests, the friction material was SD1777 with 120 psi loading, a contact area of 0.393 square inches and a mean radius of one-half inch.

TABLE I

| Surface Treatment | No Coating % Change in Fric. | No Coating Wear Mils | TiN Coating % Change in Fric. | TiN Coating Wear Mils |
|---|---|---|---|---|
| Std Tumbled | 0 | 1.0 | 3 | 1.6 |
| Knurled | −8 | 3.4 | −2 | 1.6 |
| Sandblast | −12 | 23.4 | −6 | 26.9 |
| Scotch Brite | −1 | 0.8 | 0 | 1.3 |
| 50% HCl | −4 | 0.9 | | |
| Diamond Lap (6 micron) | 32 | 5.3 | 7 | 1.6 |
| Lapmaster Compound 1700 - 14.5 micron Al$_2$O$_3$ | −6 | 0.8 | 9 | 2.4 |
| Diamond Lap (9 micron) | 62 | 8.1 | 9 | 1.9 |
| Shot Peen #1 | −4 | 0.9 | 5 | 5.5 |
| Shot Peen #1 & Tumbled | −8 | 1.0 | −3 | 2.0 |
| Shot Peen #1 & Tumbled/Annealed | −8 | 1.0 | −3 | 1.9 |

A second type of testing involving single plate tests were run at 200 F. and 120 psi. in Texaco TL8570 ATF; the test consisting of 50 cycles at 1000 rpm engagement speed, followed by 150 cycles at 2000 rpm engagement speed, and finally 10 cycles at 1000 rpm. The contact area was 8.45 square inches and the mean radius was 2.71 inches. Friction was plotted for the 10th, 50th, 60th, 200th and 210th cycles. For a comparison of materials, three readings were taken on the 200th cycle (initial, midpoint and final speed) as the friction material engaged the mating plate and slowed down. Each run was given a grade by multiplying the initial friction by 2, midpoint by 1.5 and final friction by 1, and summing the three values as seen in Table II. The column in this table labeled % is the percent increase in friction or grade over the standard SD1777 control value. The column Fc/Fa is the ratio of static friction over dynamic friction, which for ease of shifting should be less than 1.1.

Mating plate surfaces were coated with various thicknesses of titanium nitride and all coatings increased friction with the highest (13%) at 1.5 microns thick titanium nitride with no increase in the Fc/Fa ratio. The coatings were applied using the high rate reactive sputtering process covered by U.S. Pat. No. 4,428,811. Prior to coating, all samples were cleaned in acetone, alcohol and freon TES (vapor degreased). Once in the sputtering chamber, the samples were given an rf sputter etch just before coating for five minutes at a power level of 1.5 kilowatts and an argon pressure of 8 mTorr. The coatings were done in the stationary mode where the samples were moved quickly under the target and held there until the desired thickness was reached. During reactive sputter deposition, the power to the D.C. magnetron cathode was typically 10 kilowatts, and the deposition rate for titanium nitride was 500 nanometers/min.

TABLE II

| MATERIAL | % CHANGE IN FRICTION GRADE | Fc/Fa |
| --- | --- | --- |
| SD1777 Control | 0 | 1.1 |
| Aluminum Oxide Implant (lining) | 6 | 1.2 |
| Silicone Implant (lining) | 6 | 1.2 |
| Experimental Fluid 1 (no additive) | −12 | .8 |
| Experimental Fluid 2 (no friction modifier) | 8 | 1.3 |
| 58% Silicone SR80M lining | 7 | 1.6 |
| 0.5 micron Titanium Nitride (plate) | 7 | 1.1 |
| 1.5 micron Titanium Nitride (plate) | 13 | 1.1 |

Additional single plate tests were run to evaluate five different surface treatments prior to a titanium nitride coating on a separator plate (see Table III). Standard production linings (SD1777) and Exxon 1975 ATF at 200 degrees F. were used. One hundred inertia stops were performed on each lining/separator plate combination. In an inertia stop, the flywheel of the single plate tester is brought up to 2500 rpm, then declutched from the drive system, and a 100 psi load applied until the flywheel has stopped. Dynamic friction coefficients and wear were recorded, with the friction values shown being for median dynamic friction (intermittent speed).

TABLE III

| TiN Coated Separator Plate Surface Finish | Dynamic Friction At 100th Cycle | Lining Wear, mils |
| --- | --- | --- |
| As rec'd. (uncoated) | 0.150 | 0.5 |
| As rec'd. (coated) | 0.165 | 1.5 |
| Six micron compound | 0.175 | 0.7 |
| No. 6 plate | 0.175 | 1.1 |
| Roto lap | 0.180 | 2.0 |
| No. 10 plate | 0.170 | 7.3 |

All titanium nitride coated separator plates with prior surface treatment have the highest friction magnitudes during the first few cycles or inertia stops; then they tend to stabilize at a lower value. This stabilization effect seems to be attributed to a change in the lining condition because surface measurements of the coated separator plates indicate no change. Coated separator plate surfaces can be thought of as being in a "steady state". The initial dynamic friction (early running stages) magnitudes ranging from 0.190 to 0.270 for the five different surface finishes tested may be prolonged if the lining could maintain its initial surface character.

It was found that a 20% increase in the dynamic friction coefficient can be obtained without an increase of lining wear if the separator plate is treated by lapping or a similar process prior to coating. Higher friction coefficients are needed to meet demands of high torque capacity transmissions and possibly improve compatibility with new generations of automatic transmission fluids. Optimum performance appears to be obtained with a 6 micron lap compound before coating with titanium nitride, which resulted in a 0.175 dynamic coefficient of friction and 0.7 mils of lining wear. This is substantially higher friction than is produced by standard steel separator plates with no appreciable increase in wear. An increased area of contact from this 6 micron compound lapped surface may provide the proper sized cavities for automatic transmission fluid to balance shear and support phenomenon.

Titanium nitride sputtered on an "an received" separator plate increased friction to 0.165, but when this coating is coupled with the proper surface treatment, performance modifications are more pronounced. Other materials or coatings may provide increased performance provided the surface texture is substantially identical to the 6 micron compound surface and can be maintained.

Figure 6:
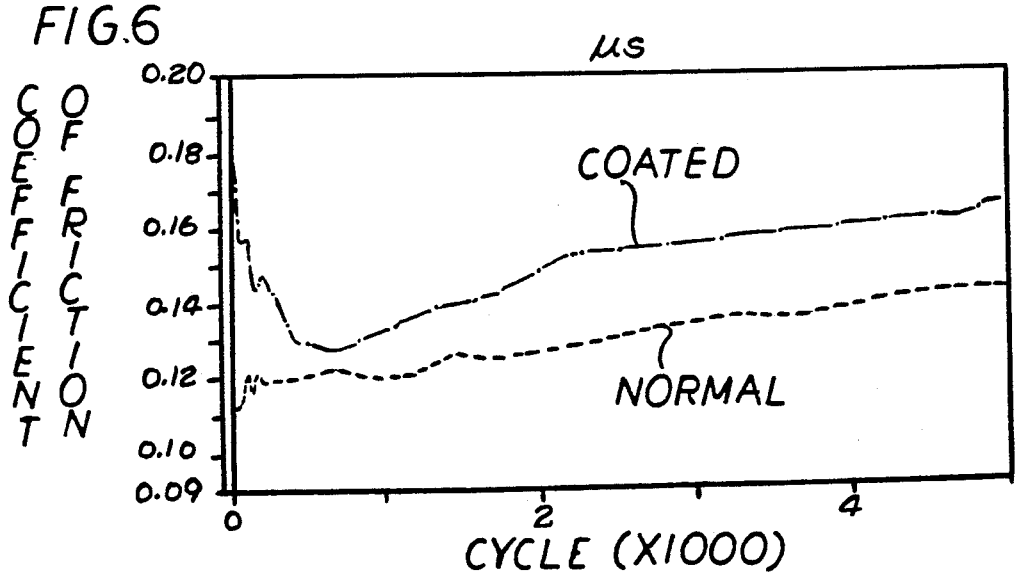
FIG. 6 is a graph similar to FIG. 3, but comparing the static friction.
Figure 7:
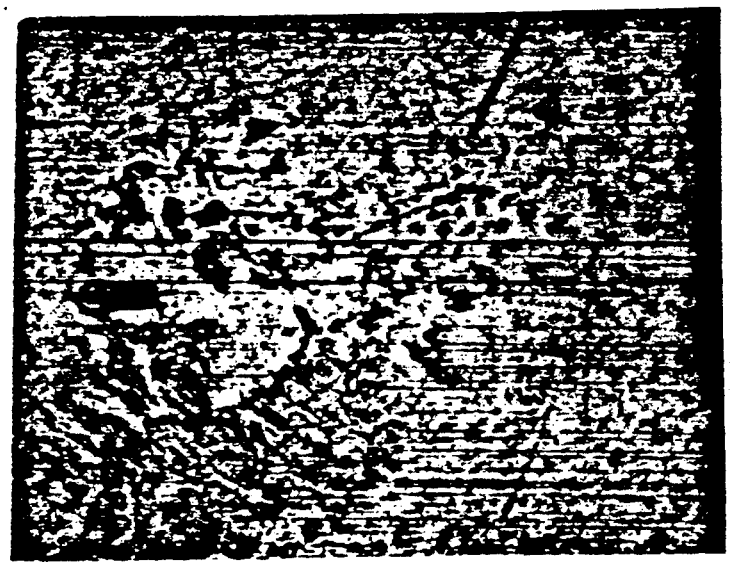
FIGS. 7 through 12 are photographs of various surface treatments for the clutch separator plates.

FIGS. 3 through 6 illustrate graphs comparing normal steel separator plates with those that have been lapped and coated with titanium nitride at initial dynamic friction, median dynamic friction and final friction coefficients, as well as static friction shown in FIG. 6. These comparisons were made in a SAE No. 2 machine for a full pack test using three clutch plates having six SD1777X facings, a Toyota JWS-2343 ATF and a temperature in the range of 212 to 230 degrees F. at a high speed of 3590 rpm. The kinetic energy of clutch engagement was 17,800 foot pounds, a contact area of 6.764 square inches, a mean radius of 2.29 inches and an inertia of 0.252 foot pounds seconds squared. In all of these four examples, the coefficient of friction of the titanium nitride sample with proper surface texture was far greater than those of the normal uncoated "as received" separator plates.

Figure 8:
Figure 9:
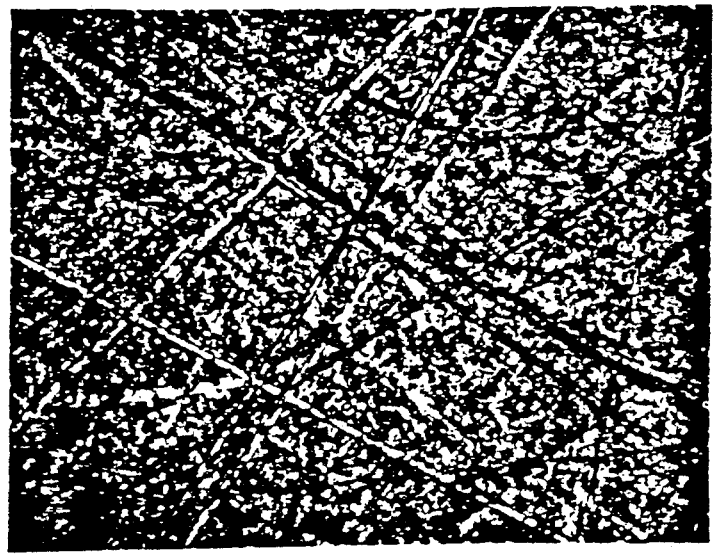

FIGS. 7 through 12 provide photomicrographs of the surface texture of the various samples of separator plate in both an "as received", surface lapped and titanium nitride coated condition. More specifically, FIG. 7 discloses an uncoated steel 1035 plate that has been tested in a clutch environment and shows substantial scratching. FIG. 8 discloses a titanium nitride coated separator plate as received which has been tumbled and tested; showing substantially no wear. FIG. 9 discloses a titanium nitride coated separator plate which was lapped with a No. 6 lapping plate prior to coating. This plate shows shallow scratches and is less rough than the next plate of FIG. 10.

Figure 10:
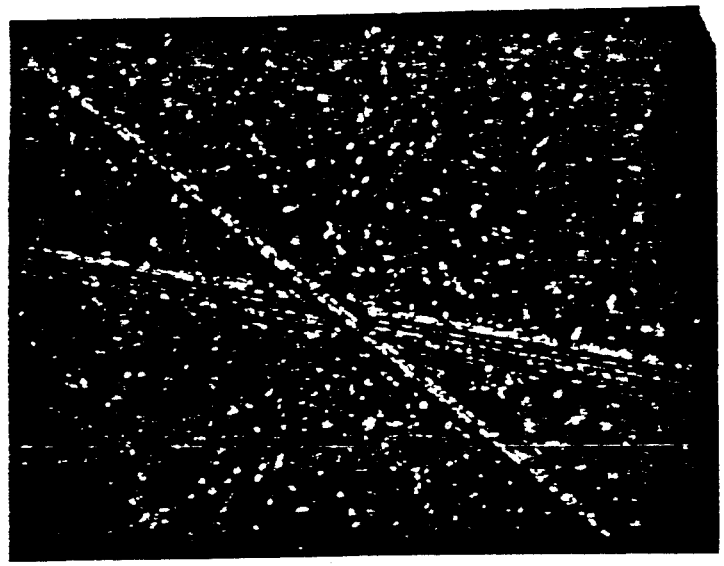
Figure 11:
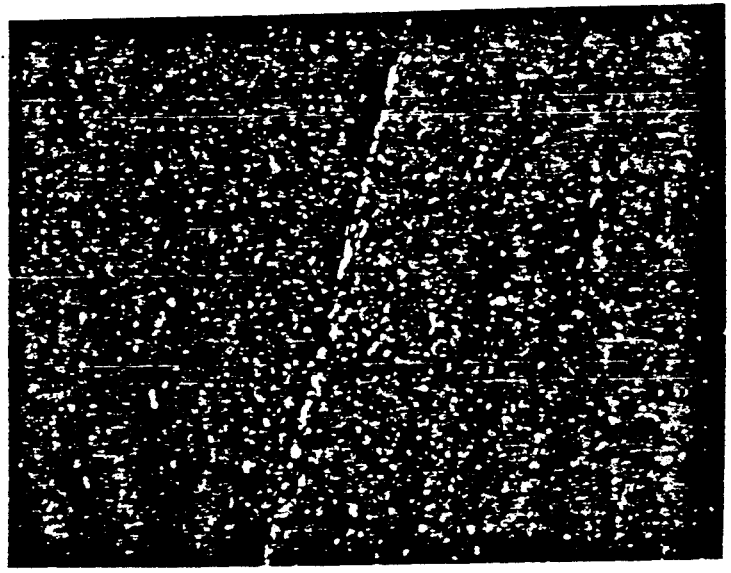
Figure 12:
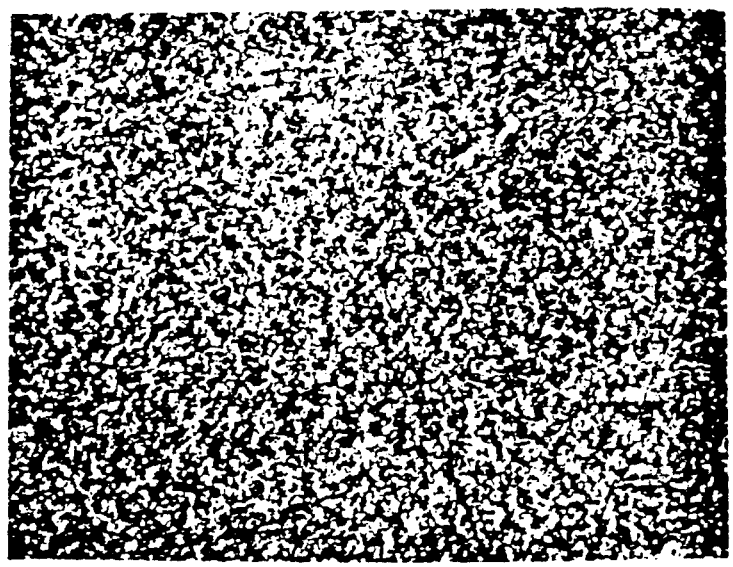

FIG. 10 discloses a titanium nitride coated plate which has been lapped with a No. 10 lapping plate before coating. This plate surface is rougher than that of the No. 6 lapping plate and shows evidence of deep scratches. FIG. 11 discloses a separator plate which has the surface treated with a RotoLap machine and then coated with titanium nitride. The surface of this plate evidences only faint scratches, but has increased bumpiness. FIG. 12 shows a separator plate which has been lapped with a number 6 lapping compound and then coated with titanium nitride. After testing, this plate shows the smoothest surface with no scratches and is the preferred plate for the present invention.

Another possible surface treatment mode which would produce the desired surface having a finish of 4 to 5 microinches (Ra) is a tumbling operation in a ceramic media. Obviously, although diamond lapping has been found to give the best results so far, other lapping compounds could achieve a surface finish with subsequent titanium nitride coating to enhance the frictional characteristics desired for the application.

INDUSTRIAL APPLICABILITY

The invention described herein is readily applicable to separator plates that are utilized in the clutch or brake packs for vehicle automatic transmissions.

I claim:
1. In a clutch pack (10) for a vehicle automatic transmission or the like wherein clutch plates (16) having friction facings (18) are interleaved with separator plates (24), the clutch plates (16) being splined to one rotatable member (14) and the separator plates being splined to a second member (12) to form a torsional coupling or brake, the improvement comprising that each separator plate (24) has a surface texture enhancing the frictional characteristics of the clutch plates without substantially increasing the frictional wear of said clutch plates, each said separator plate having its opposite faces (44) provided with a surface texture in the range of 3 to 9 microinches (Ra) and covered with a thin metallic nitride coating (46).

2. A clutch separator plate as set forth in claim 1, in which the faces (44) of each separator plate (24) are lapped with a suitable lapping compound to provide said surface texture prior to coating.

3. A clutch separator plate as set forth in claim 2, in which the surfaces (44) of the separator plate (24) are treated with a diamond lapping compound.

4. A clutch separator plate as set forth in claim 1, in which the lapped separator plate faces (44) are coated with titanium nitride (46).

5. A clutch separator plate as set forth in claim 4, wherein the sputter coating (46) is equal to or less than 1.5 microns, so as not to alter the surface texture of the lapped plate (24).

6. In a clutch pack (10) for a vehicle automatic transmission or the like wherein clutch plates (16) having friction facings (18) are interleaved with separator plates (24), the clutch plates (16) being splined to one rotatable member (14) and the separator plates being splined to a second member (12) to form a torsional coupling or brake, the improvement comprising that each separator plate (24) has a surface texture enhancing the frictional characteristics of the clutch plates without substantially increasing the frictional wear of said plates, each said separator plate having its opposite faces (44) provided with a surface texture coated with a thin metallic nitride coating (46), the wear of the coated separator plate (24) in use is in the order of less than 2.0 microinches.

7. In combination with clutch friction plates (16) having a resin-based paper friction material (18) applied thereto, clutch separator plates (24) having a surface texture thereon which enhances the frictional characteristics of the friction lining without increasing the wear thereof, each said separator plate (24) having a surface texture in the Ra range of from 3 to 9 microinches covered with a thin coating of a metallic nitride compound (46).

8. In the combination of claim 7, wherein the surface texture of the plates (24) is achieved by lapping with a suitable lapping compound.

9. In the combination of claim 4, wherein the surface texture of the separator plates (24) is formed by lapping the surfaces (44) and coating with a titanium nitride coating (46).

10. In the combination of claim 8, wherein the separator plate (24) is lapped with a diamond lapping compound.

* * * * *

UNITED STATES PATENT AND TRADEMARK OFFICE
CERTIFICATE OF CORRECTION

PATENT NO. : 5,029,686
DATED : July 9, 1991
INVENTOR(S) : Marc A. Yesnik It is certified that error appears in the above-identified patent and that said Letters Patent is hereby corrected as shown below:

<u>TITLE PAGE</u>

In the Abstract:

Line 8, change "the sputter" to --then sputter--

In the Drawings (Sheets 1 - 5)

Change "9,029,686" to --5,029,686--

Signed and Sealed this

Thirty-first Day of May, 1994

Attest:

BRUCE LEHMAN

Attesting Officer     Commissioner of Patents and Trademarks